(12) United States Patent
Ishikawa et al.

(10) Patent No.: US 9,384,603 B2
(45) Date of Patent: Jul. 5, 2016

(54) FAILURE CAUSE CLASSIFICATION APPARATUS

(71) Applicant: HITACHI HIGH-TECHNOLOGIES CORPORATION, Tokyo (JP)

(72) Inventors: Masayoshi Ishikawa, Tokyo (JP); Hideaki Suzuki, Tokyo (JP); Tomoaki Hiruta, Tokyo (JP); Toshio Masuda, Tokyo (JP); Ken Kikegawa, Tokyo (JP)

(73) Assignee: HITACHI HIGH-TECHNOLOGIES CORPORATION, Tokyo (JP)

( * ) Notice: Subject to any disclaimer, the term of this patent is extended or adjusted under 35 U.S.C. 154(b) by 0 days.

(21) Appl. No.: 14/625,466

(22) Filed: Feb. 18, 2015

(65) Prior Publication Data

US 2015/0279129 A1    Oct. 1, 2015

(30) Foreign Application Priority Data

Mar. 25, 2014    (JP) ................................. 2014-061117

(51) Int. Cl.
*G07C 5/08* (2006.01)
*B60K 35/00* (2006.01)
(Continued)

(52) U.S. Cl.
CPC .............. *G07C 5/0808* (2013.01); *B60K 35/00* (2013.01); *G05B 23/0281* (2013.01); *G06Q 10/20* (2013.01)

(58) Field of Classification Search
CPC ............ G08B 21/0423; G08B 21/0484; G06F 11/0709; G06F 11/0748; G06F 11/076; G06F 11/3051; G06F 11/3055; G06F 11/327; G06F 11/328; G06F 11/3466; G06F 11/3495; G06F 2201/81; G06F 2201/875; G06N 7/005; G06Q 10/06; G06Q 10/0635; H04L 41/0613; H04L 41/065; H04L 43/0817; Y04S 20/242; Y04S 20/32
USPC ...................... 700/94; 702/19, 182; 705/7.28; 709/202; 714/43; 370/223; 340/506
See application file for complete search history.

(56) References Cited

U.S. PATENT DOCUMENTS 6,021,437 A *  2/2000  Chen ................... G06F 11/0709
                                                                  709/202
2004/0030531 A1*  2/2004  Miller .................. A61B 5/0002
                                                                  702/182

(Continued)

FOREIGN PATENT DOCUMENTS

JP              5363927 B2    9/2013

OTHER PUBLICATIONS

Michael E. Tipping et al., "Mixtures of Probabilistic Principal Component Analyzers", Neural Computation 11, pp. 443-482 (1999).

*Primary Examiner* — James Trammell
*Assistant Examiner* — Sanjeev Malhotra
(74) *Attorney, Agent, or Firm* — McDermott Will & Emery LLP

(57) ABSTRACT

Selection of sensors requires the knowledge of individual sensors mounted on a target machine and the knowledge of mechanical features of the machine. In the past, experts having mechanical knowledge selected the sensors. The present invention involves analyzing sensor data at e of machine failure, extracting features from the sensor data regarding each failure cause, and comparing the extracted features so as to clarify the difference between the sensor data about the failure causes and present an operator with the clarified difference thereby to support sensor selection. The invention makes it possible to select more simply than before the sensors considered effective for classifying failure causes. For example, the sensors deemed effective for classifying failure causes without mechanical knowledge can be selected.

10 Claims, 15 Drawing Sheets

(51) Int. Cl.
*G06Q 10/00* (2012.01)
*G05B 23/02* (2006.01)

(56) References Cited

U.S. PATENT DOCUMENTS

| | | | | |
|---|---|---|---|---|
| 2005/0160324 A1* | 7/2005 | Przytula | ................. | G06N 7/005 714/43 |
| 2007/0086331 A1* | 4/2007 | Manral | ................... | H04J 3/085 370/223 |
| 2008/0316015 A1* | 12/2008 | Naedele | .............. | H04L 41/0613 340/506 |
| 2009/0048694 A1* | 2/2009 | Matsuda | .................. | G10H 1/40 700/94 |
| 2009/0276261 A1* | 11/2009 | Chen | .................. | G06Q 10/0635 705/7.28 |
| 2011/0010106 A1* | 1/2011 | Katsukura | .............. | G01D 4/002 702/19 |

* cited by examiner

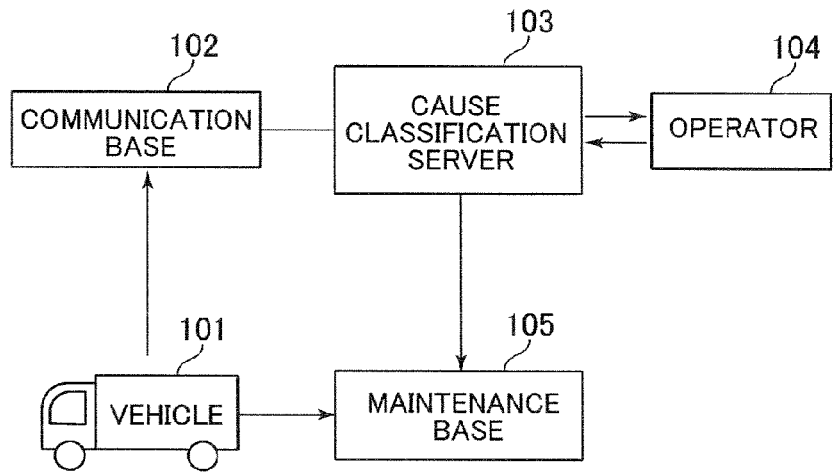
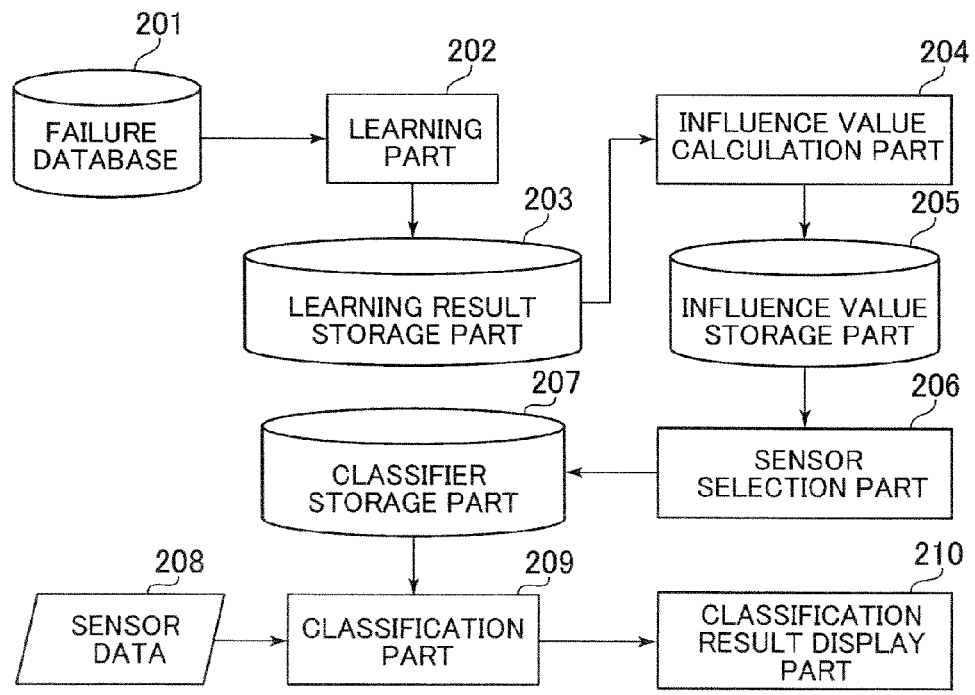

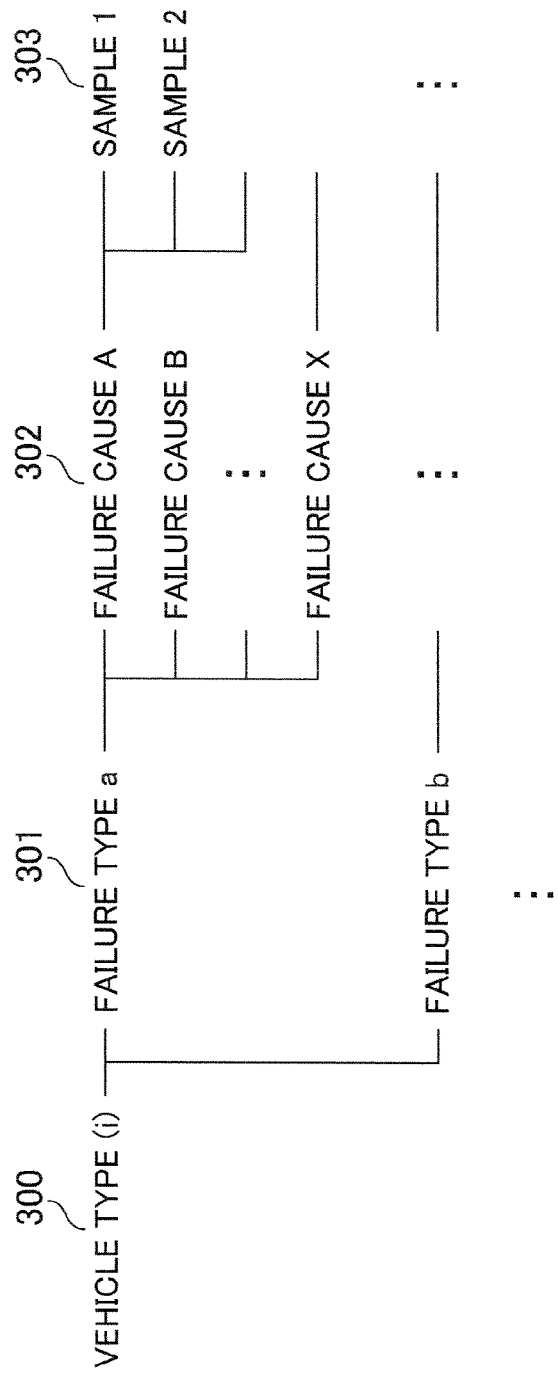

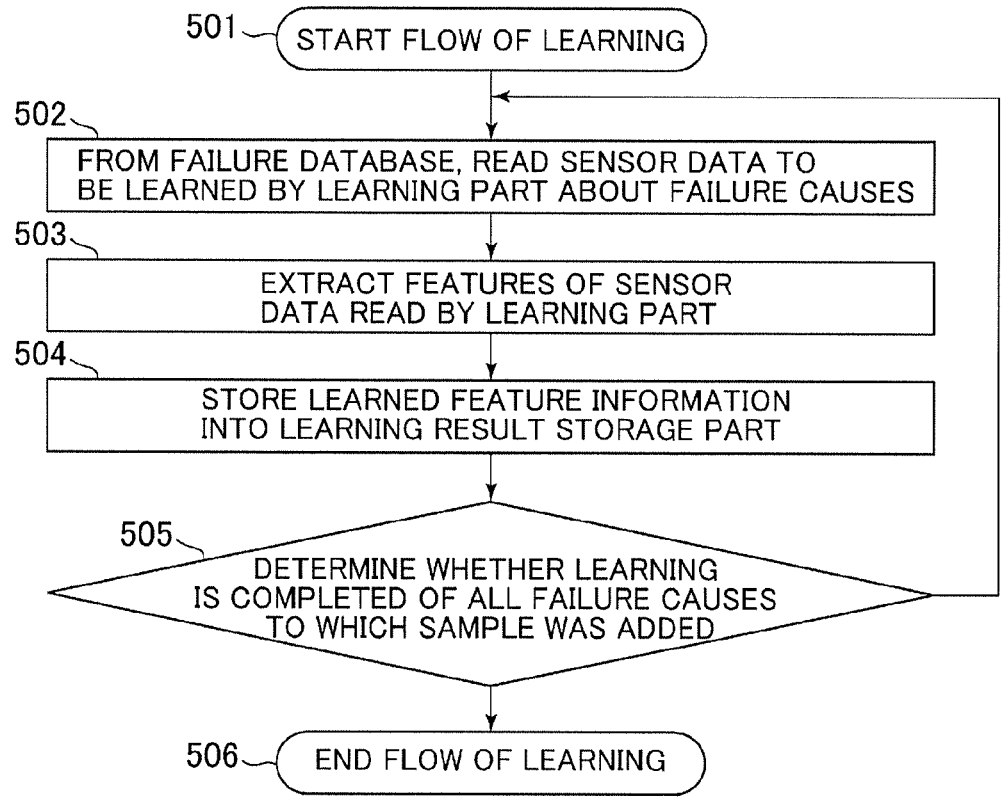
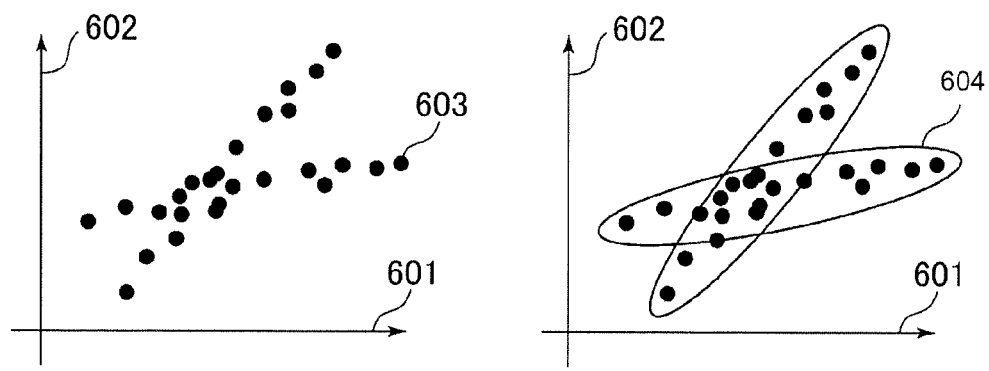

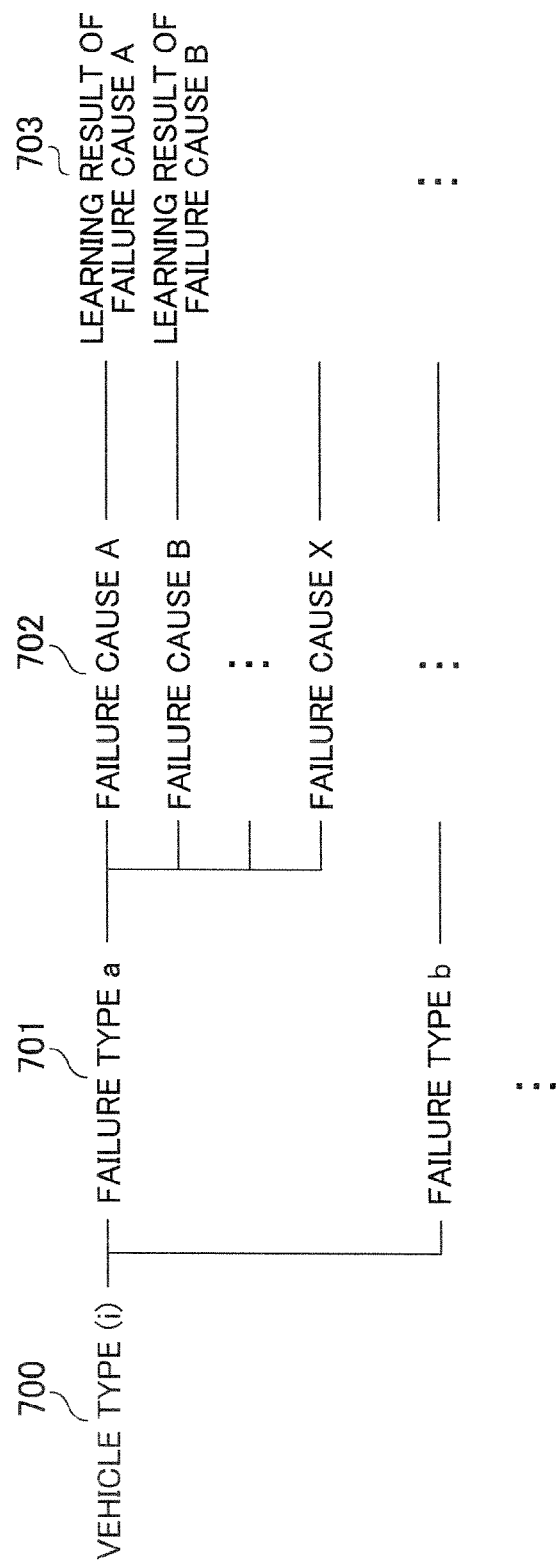

FIG. 17

$$d_{i,j} = \overbrace{\|\mu_{i,crack} - \mu_{j,choke}\|}^{1701} \cdots \text{EXPRESSION 1}$$

$$d_{i,j} = \|W_{i,crack} - W_{j,choke}\| \cdots \text{EXPRESSION 2}$$

$$e_k = (\mu_{k,i,crack} - \mu_{k,j,choke})/d \cdots \text{EXPRESSION 3}$$

$$e_k = (W_{k,i,crack} - W_{k,j,choke})/d \cdots \text{EXPRESSION 4}$$

$$R = \pi_{i,crack} N_{crack} + \pi_{j,choke} N_{choke} \cdots \text{EXPRESSION 5}$$

$$R = N_{i,crack} + N_{j,choke} \cdots \text{EXPRESSION 6}$$

$$R = (\pi_{i,crack} N_{crack} + \pi_{j,choke} N_{choke}) * (S_n - S_{n-1}) \cdots \text{EXPRESSION 7}$$

FAILURE CAUSE CLASSIFICATION APPARATUS

CROSS-REFERENCE TO RELATED APPLICATIONS

This application claims priority to Japanese Patent Application No. 2014-061117 filed Mar. 25, 2014 the subject matter of which is incorporated herein by reference in entirety.

BACKGROUND OF THE INVENTION

1. Field of the Invention

The present invention relates to an apparatus and a method for analyzing time series data obtained from sensors.

2. Description of the Related Art

In business where commercial vehicles such as freight trucks are used, their utilization rate determines the profit and loss of the operation. This has given rise to a move to reduce downtime for maintenance by rapidly identifying the cause of a mechanical failure that has occurred.

In the past, comparing the operation data when the machine failed against past failure data used to identify the causes of failure. In such cases the sensors for use upon the comparison are carefully selected so that possible failure causes can be classified with accuracy. JP-5363927-B, for example, states that the conditions required of the sensors to identify normal and failed states are obtained by combining multivariate analysis with mechanical knowledge.

SUMMARY OF THE INVENTION

Selecting deliberately the sensors for use in comparing the operation data at a time of mechanical failure against that in previous cases can raise the accuracy of failure identification.

Numerous sensors are attached to machines; one vehicle is furnished with more than a hundred sensors, for example. This means that selecting appropriate sensors requires the knowledge about every single sensor installed and about the mechanical features of the target machine. So far, the sensors have been selected by experts who have the knowledge on the machine.

Furthermore, a huge amount of man-hours is required in order to select the sensors for each machine type and for each failure cause. In a case of an as-yet-unknown failure, there exists no mechanical knowledge in the first place. For this reason, it is necessary to select the sensors for identifying the failure cause without resorting to mechanical knowledge. This aspect is not addressed in the above-mentioned patent document.

An object of the present invention is to determine that any status other than that which is related to abnormality data serving as the basis is normal.

Another object of the present invention is to analyze sensor data at a time of machine failure, extract features from the sensor data regarding each failure cause, compare the extracted features so as to clarify the difference between the sensor data on the failure causes, and present an operator with the clarified difference for sensor selection.

According to the present invention, it is possible to select more simply than before the sensors considered effective for classifying failure causes. For example, the sensors deemed effective for classifying failure causes can be selected without mechanical knowledge.

BRIEF DESCRIPTION OF THE DRAWINGS

FIG. 1 is a diagram showing a system of one embodiment of the present invention;

FIG. 2 is a diagram showing a structure of a server for classifying failure causes;

FIG. 3 is a diagram showing a hierarchy in a failure database;

FIG. 5 is a flowchart of operations performed by a learning part;

FIG. 6 is a diagram explaining feature quantities;

FIG. 7 is a diagram showing a hierarchy in a learning result storage part;

FIG. 17 is a diagram explaining expressions 1 through 7.

DESCRIPTION OF THE PREFERRED EMBODIMENTS

Figure 4:
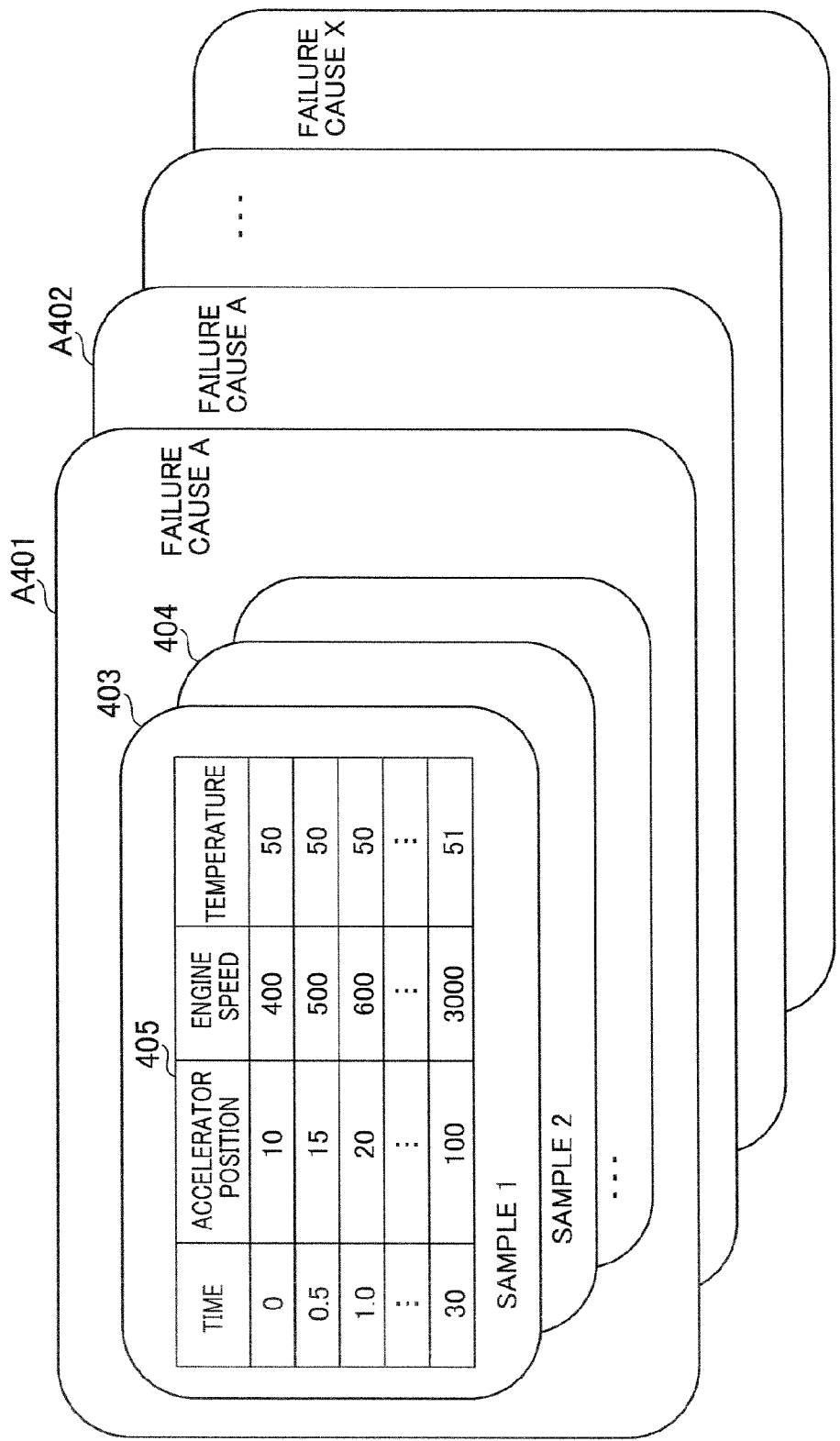
FIG. 4 is a diagram showing samples in the failure database.

Some embodiments of the present invention will he explained below with reference to the accompanying drawings.

First Embodiment

FIG. 1 is a diagram explaining a system of one embodiment of the present invention. The system of the present embodiment includes a vehicle 101, a communication base 102, a cause classification server 103, and a maintenance base 105. An operator 104 operates the cause classification server 103.

Numerous sensors are incorporated in the vehicle 101. At a time of failure the sensor data detected by the sensors are sent from the vehicle 101 via the communication base 102 and received by the cause classification server 103.

The cause classification server 103 classifies the received sensor data into possible failure causes and then transmits the result of the classification to the maintenance base 105. The settings for cause classification such as the selection of sensors have been made beforehand by the operator 104. The maintenance base 105 performs efficient maintenance work using the received information about the classified failure causes.

The vehicle 101, communication base 102, cause classification server 103, maintenance base 105, and an interface operated by the operator 104 can communicate with one another over a standardized high-speed network. The high-speed network may include at least either a wired or a wireless network.

FIG. 2 shows a structure of the cause classification server 103. The cause classification server 103 includes a failure database 201, a learning part 202, a learning result storage part 203, an influence value calculation part 204, an influence value storage part 205, a sensor selection part 206, a classifier storage art 207, sensor data 208, a classification part 209, and a classification result display part 210.

The failure database 201 is a part that stores the sensor data related to failure information and retains vehicle failure types, failure causes, and samples by vehicle type. These items of information are written by the operator 104 successively from samples each specifying the vehicle type, failure type, and failure cause.

The vehicle type in this context is self-explanatory. For example, the vehicle type may represent a vehicle model.

The failure type is information about a phenomenon that appears on the vehicle at a time of failure. An example of the failure type is an unexpected engine stop.

The failure cause is information about events that contribute to the causes of failure types. One failure type is related to at least one failure cause. For example, the possible causes of an engine stop include a crack in the inner walls of the engine, a choked engine, and a failure of sensors for measuring the engine speed.

The samples are each an aggregate of diverse sensor data at a time of vehicle failure. More specifically, the samples are composed of the sensor data arranged on a time-series basis. One failure cause includes at least one item of sensor data.

FIG. 3 shows a hierarchical structure in the failure database 201 of the present embodiment. A vehicle type layer 300 stores a vehicle type (i), etc. A failure type layer 301 stores failure types a, b, etc. A failure cause layer 302 stores failure causes related to each of the failure types in the failure type layer 301. For example, the failure cause layer 302 stores failure causes A, B, . . . X related to the failure type a under the vehicle type (i). More specifically, if an engine stop is stored as the failure type a, the failure cause layer 302 stores such failure causes as cracks, chokes, and sensor failure. A sample layer 303 stores samples each related to a given failure cause under a given failure type.

FIG. 4 shows a format of the sample layer 303 stored in the failure database 201. In this layer, a failure cause A401 and a failure cause A402 each coincide with a failure cause in the failure cause layer 302. Samples 403 and 404 related to the failure cause A401 are stored in the layer below the failure cause A. A data format 405 represents the format of samples. As indicated by the data format 405, a sample 1 stores sensor data at the time of failure as time-series data synchronized with time, the sensor data being exemplified by accelerator position, engine speed, and temperature. As shown in FIG. 4, the failure cause A is related to multiple samples such as sample 1 and sample 2.

The learning part 202 learns the features of each failure cause using information from the failure database 201 and then writes the result of learning to the learning result storage part 203. Every time a new sample is written to the failure database 201 in relation to a vehicle type, a failure type, and failure causes, the learning part 202 processes the failure causes related to the new sample. It should be noted here that only failure data are written to the learning part 202. The reason the failed-state data alone are written is that acquisition and storage of normal-state data can entail increased costs of data collection and storage.

The processing performed by the learning part 202 will be explained below with reference to the flowchart of FIG. 5. At the time the above-mentioned sample is added, the learning part 202 performs step 501 to start a learning flow.

In step 502, the learning part 202 reads the sensor data in the added sample from the failure database 201.

In step 503, the features of the sensor data read by the learning part 202 are learned. Learning, for example, can be the acquisition of the features of sensor data. Here, the learning performed by the learning part 202 refers to machine learning. In the present embodiment two techniques will be discussed: MPPCA (Mixtures of Probabilistic Principal Component Analyzers); and approximation by mixture of normal distributions. In the case of the MPPCA, the features to be learned in step 503 are cluster number, average, weighted matrix, variance, and mixture ratio. In the case of approximation by mixture of normal distributions, the features to be learned are cluster number, average, covariance matrix, and mixture ratio. The machine learning generally involves detecting abnormalities (failures) in reference to normal-state data and classifying the detected abnormalities. This technique is characterized by the ability to classify failures on the basis of only abnormal-state (failure; data.

FIG. 6 gives a rough diagram of the machine learning. Sensor axes 601 and 602 represent the axes for the sensors for use in carrying out multivariate analysis. Although FIG. 6 shows a space defined by two sensors, actual sensor data constitute high-dimensional spaces because they involve numerous sensor types. Sensor data 603 represent the sensor data items in the space defined by the sensor axes 601 and 602.

Feature quantities 604 indicate the features extracted by the learning part 202. What is calculated with the MPPCA are an average indicative of the center coordinates of an ellipse representing each of the feature quantities 604, a weighted matrix and a variance expressing the shape of each ellipse, and a mixture ratio indicative of the ratio of the sensor data in two ellipses. What is calculated with approximation by mixture of normal distributions are an average as the center coordinates of an ellipse representing each of the feature quantities 604, a covariance matrix expressing the shape of each ellipse, and a mixture ratio indicative of the ratio of the sensor data in the two ellipses. According to this technique, failures can be classified on the basis of abnormal-state (failure) data alone. It should be noted that the above-described features are only examples and other features may also apply. Furthermore, the above technique is only an example; some other suitable machine learning technique may be utilized instead.

In step 504, the feature information learned by the learning part 202 is stored into the learning result storage part 203 in relation to the vehicle type, failure type, and failure causes.

In step 505, it is determined whether learning is completed of all failure causes applicable to the added sample. If it is determined that learning is completed of all failure causes, step 506 is reached. If it is determined that learning has yet to be completed of all failure causes, step 502 is reached again, after which the sensor data on failure causes that have yet to be learned are read.

In step 506 the learning flow is terminated.

The learning result storage part 203, which is a part that stores the results of learning related to failure information, retains the vehicle types, failure types, failure causes, and learning results by each failure cause. These items of information are written by the learning part 202 at the time the learning of the features by failure type is completed. FIG. 7 shows a hierarchical structure of the learning result storage part 203.

FIG. 7 gives a hierarchical structure of the learning result storage part 203 of the present embodiment. A vehicle type layer 700 stores a vehicle type (i), etc. A failure type layer 701 stores failure types a, b, etc. A failure cause layer 702 stores failure causes A, B, . . . X related to each of the failure types in the failure type layer 701. If the failure type layer 701 stores an engine stop, for example, the failure cause layer 702 stores cracks, chokes, and sensor failure as the failure causes A, B, ... X. A sample layer 703 stores learning results related to vehicle types, failure types, and failure causes.

The influence value calculation part 204 calculates, using the information from the learning result storage part 203, the value of how much each of the failure causes relevant to each failure type influences the classification. The influence value calculation part 204 then writes the result of the calculation to the influence value storage art 205. These processes are performed at the time the learning part 202 completes the learning flow after it learns features.

The present embodiment describes effectiveness values, reliability values, sensor value features, and classification performance to measure influence values. The effectiveness value in this context represents the degree of contribution of each sensor to the difference of features between failure causes. The reliability value, sensor value features, and classification performance make up an index for testing whether the above-mentioned effectiveness is reliable. The effectiveness value may also be said to be the degree of contribution of the sensors that have output the sensor data relevant to the difference of features between failure causes.

Figure 8:
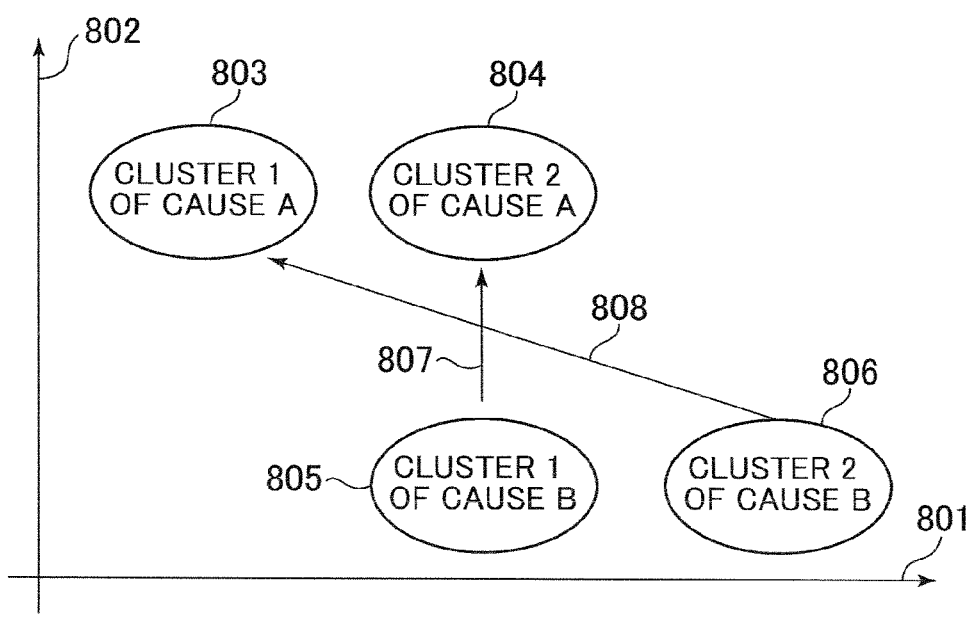
FIG. 8 is a diagram showing the concept of an influence value calculation part.
Figure 9:
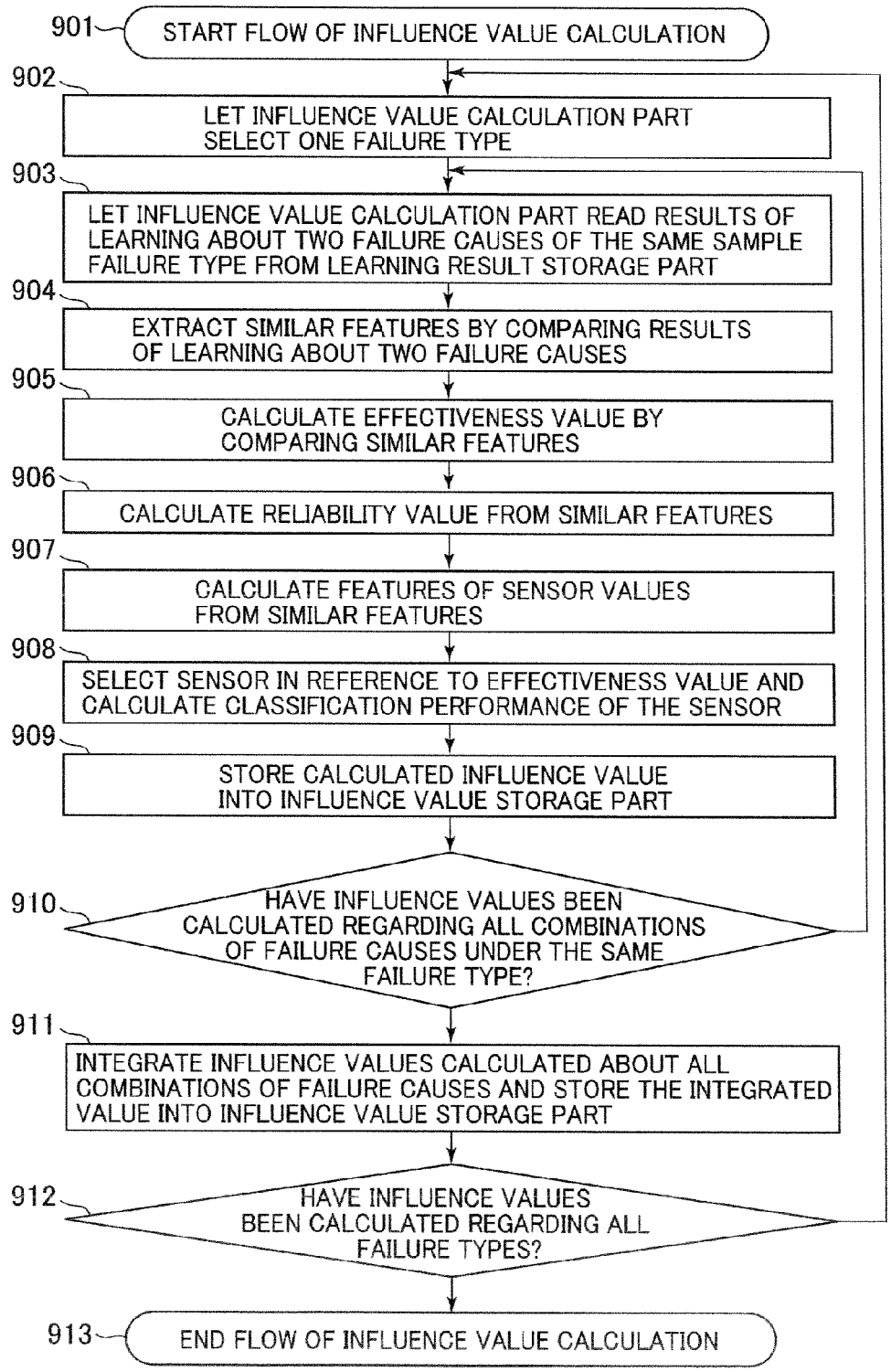
FIG. 9 is a flowchart of operations performed by the influence value calculation part.

FIG. 8 roughly depicts the processing performed by the influence value calculation part 204. The flow in FIG. 9 shows detailed processing carried out by the influence value calculation part 204.

FIG. 8 explains a rough diagram of the influence value calculation part 204. FIG. 8 includes: sensor axes 801, and 802; clusters 803, 804, 805, and 806; and a differential vector 807.

The sensor axes 801 and 802 represent the axes of the sensors for use in carrying out multivariate analysis. The clusters 803, 804, 805 and 806 represent, respectively, cluster No. 1 of the failure cause A, cluster No. 2 of the failure cause A, cluster No. 1 of the failure cause B, and cluster No. 2 of the failure cause B. The clusters 803, 804, 805, and 806 are multiple feature quantities 604 extracted by the learning part 202 with regard to each failure cause. The differential vector 807 corresponds to the differences between the features for use in calculating influence values.

The influence value calculation part 204 extracts similar features from the features of two failure causes. By comparing the similar features thus extracted, the influence value calculation part 204 calculates the influence value of each sensor as the degree of influence on the classification of failure causes.

In FIG. 8, the sensor of the sensor axis 802 is to be noted in classification of the clusters 803 and 804 serving as clusters 1 and 2 of the failure cause A as well as the clusters 805 and 806 serving as clusters 1 and 2 of the failure cause B. The reason for this is that with regard to the sensor of the sensor axis 801, there exists a region where the ranges of the values that can be taken by the failure causes A and B overlap with each other. That is, the regions taken up by the clusters 804 and 805 on the sensor axis 801 approximately coincide with each other. On such a sensor axis, it is difficult to classify failure causes. Along the sensor axis 802, on the other hand, there is no region where the ranges of the values taken by the failure causes A and B coincide with each other. Thus it is easy to classify failure causes on the sensor axis 802. The sensor axis 802 is thus given a high influence value for supporting the user's selection. The comparison of similar features is effective in calculating such influence values.

In FIG. 8, the features similar to each other between the failure causes are the cluster 804 serving as cluster 2 of the failure cause A and the cluster 805 serving as cluster 1 of the failure cause B. The differential vector 807 representative of the difference between these features is oriented in the same direction as the sensor axis 802 considered effective for failure cause classification. This allows a high influence value to be granted to the sensor involved.

The operating conditions in which failures occur in machines such as vehicles vary from one failure cause to another. Moreover, the features of each sensor can vary significantly depending on the operating condition. For this reason, simply comparing the features of two failure causes may lead to extracting not only the difference in influence value between the failure causes but also many other differences such as the differences of operating conditions in which the failure occurred as well as changes in sensor features. As a result, it is difficult to extract the sensors that are truly effective for failure cause classification.

In the present embodiment, comparing the features particularly similar to one another between two failure causes will bypass such a difficulty. It also clarifies the difference between the features of the sensors in similar operating conditions. An influence value is then calculated as an index for selecting the sensors effective for failure cause classification. The influence value to be discussed later may be said to be such a typical index.

If the influence value were to be calculated by computation of the inter-feature difference with combinations of those features not similar to one another, the calculations would be as follows: First consider a case where the cluster 803 serving as cluster 1 of the failure cause A is compared with the cluster 806 serving as cluster 2 of the failure cause B. In this case, the vector of the differences between the features would be a differential vector 808 oriented from the cluster 806 toward the cluster 803. The differential vector 808 would include not only the sensor axis 802 considered effective for failure cause classification but also the components of the sensor axis 801 not deemed effective for failure cause classification. Because the differential vector 808 obtained by combining the features not similar to one another would include information about a sensor axis not effective for failure cause classification, it would be difficult to grant a high influence value to the sensor axis effective for failure cause classification. For this reason, it will be important to compare similar features in granting a high influence value to the sensor effective for failure cause classification. Moreover, when a high influence value is granted to the sensor effective for failure cause classification, it will be possible to classify the failure without resorting to normal-state data and solely on the basis of abnormal-state (failure) data.

FIG. 9 shows a flow of processing performed by the influence value calculation part 204, the flow being one that allows an effectiveness value to be acquired as a typical influence value. In step 901, the influence value calculation part 204 starts the flow of influence value calculations. This processing is performed at the time the learning part 202 completes the learning flow after learning the features of all samples added to the failure database 201.

In step 902, the influence value calculation part 204 selects one failure type. The failure type is selected from the failure types learned anew by the learning part 202. For this reason, every time a sample is added to the failure database 201, the influence value calculation part 204 calculates the effectiveness value of the failure type regarding the sample data in the added sample.

In step 903, the influence value calculation part 204 reads from the learning result storage part 203 the results of learning (e.g., features) about at least two failure causes substantially under the same failure type. If the failure type is an engine stop, for example, there will be three results of learning: the result of learning at a time of occurrence of a crack, that of learning at a time of occurrence of a choke, and that of learning at a time of occurrence of a sensor failure. Thus there exist three combinations of learning results: the combination of the learning result from the crack and the learning result from the choke; that of the learning result from the crack and the learning result from the sensor failure; and that of the learning result from the choke and the learning result from the sensor failure. The learning results are compared with one another with regard to each of these combinations.

In step 904, the influence value calculation part 204 compares the learning results (e.g., features) of two failure causes and extracts similar features therefrom.

Described below is first the case where the MPPCA is adopted as the learning algorithm. In this case, there exist as many features as the number of clusters with a single failure cause. If the cluster number is 3, for example, there will exist such features as average, weighted matrix, variance, and mixture ratio for cluster No. 1; features such as average, weighted matrix, variance, and mixture ratio for cluster No. 2; and features such as average, weighted matrix, variance, and mixture ratio for cluster No. 3. Thus the features of clusters Nos. 1 through 3 at the time of occurrence of the crack are compared with the feature of clusters Nos. 1 through 3 at the time of occurrence of the choke. From the compared features regarding the crack and choke, combinations of similar features are extracted. For example, for the comparison through an average of learning results, the expression 1 (see FIG. 17) is used as the index. Whereas clusters may be expressed in diverse fashion, one expression may be an aggregate of relevant sample data.

In the expression 1, reference character represents the difference between two features, and reference numeral 1701 denotes a vector norm. Reference character $\mu$ represents the average; subscript $_{i,crack}$ denotes an average of cluster No. i of the crack; and subscript $_{i,choke}$ represents an average of cluster No. j of the choke. The similar features means a combination in which the difference d between two features (i and j) is smaller than a predetermined value. Thus when the difference $d_{i,j}$ is smaller than the predetermined value, such features as average, weighted matrix, variance, and mixture ratio are extracted with regard to the i-th cluster related to the crack as the failure cause and the j-th cluster related to the chock as the failure cause. The features may be said to be an expression that includes information about clusters.

The extraction of similar combinations may also be made from the features other than those averaged. The expression 2 (see FIG. 17) represents a comparison based on weighted matrix.

In the expression 2, reference character W represents weighted matrix. If the averages are similar to each other between failure causes, that means the operating points involved are similar to each other because the ranges in which sensor data have been collected are similar to one another. Also, if the weighted matrices are similar to each other between failure causes, that means the operating characteristics involved are similar to one another due to the changes of sensor data being similar to each other.

When the similar features are extracted by use of the above index, it is possible to compare the features of the sensors in similar operating environments.

After the similar features have been extracted in step 904, the influence value calculation part 204 in step 905 compares the features extracted in step 904 to calculate an effectiveness value. The effectiveness value is calculated in accordance with the difference between the similar features. The expression 3 (see FIG. 17) represents the effectiveness value of each sensor when evaluation is made with the difference between averages.

In the expression 3, reference character $e_k$ denotes the effectiveness value of the sensor. Reference character $\mu$ represents the average; subscript $_{k,i,crack}$ denotes an average of the k-th sensor in cluster No. i of the crack; and subscript $_{k,i,choke}$ represents an average of the k-th sensor in cluster No. j of the choke. Cluster numbers $_{i,j}$ represent the combination in which the features are determined to be similar.

The evaluation of the effectiveness value based on weighted matrix is performed by use of the expression 4 (see FIG. 17). In the expression 4, reference character W denotes the weighted matrix.

The effectiveness value $e_k$ is a value indicative of how effective the k-th sensor is for failure cause classification. The larger this value becomes, the more effective the sensor may be considered for failure cause classification. If the average, for example, is used for the comparison of features with the sensor data collected at similar operating points, the sensors with high effectiveness values will have different operating points. These different points will clarify the difference between environments in which different failure causes occur. If weight matrix is used for the comparison with operating characteristics that deem similar, the sensors with high effectiveness values will present a different behavior each. This clarifies the difference in influence of the different failure causes on the operating characteristics. A sensor calculated in this manner to have a high effectiveness value makes a large contribution to the difference between sensor data by failure cause. Since the user is shown an effectiveness value and consequently makes selections centering on the sensors having high effectiveness values, it is possible to select those sensors deemed effective for failure cause classification without resorting to mechanical knowledge.

The features can be compared by use of not only averages and weighted matrices but also combinations of the features. The combination of, for example, the average, weighted matrix, and variance about clusters will provide normal distribution approximation in the sensor data space. The approximation will hence allow the features to be compared with the use of the value called the Kullback-Liebier distance between normal distributions. That is, the contribution ratios of sensors over the Kullback-Liebler distance respectively show the effectiveness values of the sensors.

If techniques based on approximation by mixture of normal distributions are adopted, the effectiveness value can be calculated with techniques similar to those based on mixture of normal probability distributions.

Calculating the effectiveness value through approximation by mixture of normal distributions, as with the MPPCA, involves extracting similar features between failure causes and calculating the contribution of each sensor to the difference between the similar features. That is, the combination of the clusters obtained by the learning part as those with the smallest difference therebetween in terms of averages or variances is extracted, and the ratio of contribution of each sensor to the difference between averages or between variances is calculated.

After the similar features have been extracted in step 904, the influence value calculation part 204 in step 906 compares the extracted features to calculate the reliability value.

The reliability value can be obtained by use of a function of the number of sensor data used for evaluating the effectiveness value. In the present embodiment, as expressed by the expression 5 (see FIG. 17), the reliability value is acquired with the mixture ratio of the clusters used for evaluating the effectiveness value and the number of samples regarding all failure causes.

In the expression 5, reference character R stands for the reliability value, $\pi$ for the mixture ratio, and N for the number of samples applicable to the failure causes. Subscripts $_{i,j}$ denote a cluster number each, while $_{crack}$ and $_{choke}$ respectively represent a crack and a choke. $\pi_{i,crack}$ denotes the mixture ratio of cluster No. i regarding the crack, and $N_{crack}$ represents the number of sample data at the time of occurrence of the crack.

Also, the reliability value R may be expressed as the sum of the number of samples given by the expression 6 (see FIG. 17). In the expression 6, $N_{i,crack}$ denotes the number of sample data assigned to the i-th cluster regarding the crack. This is the number of sample data in the i-th sample determined to be the nearest from among the clusters Nos. 1 through 3.

The reliability value may also be a value in consideration of classification performance. First, the influence value calculation part 204 selects one sensor after another in descending order of effectiveness value until the sum of the effectiveness values of the selected sensors reaches a predetermined percentage of the sum of the effectiveness values of all sensors. The sensors thus obtained are used for failure cause classification of the samples in the failure database in the same manner as done by the classification part 209. At this time, of the samples classified, the ratio of those classified into the correct failure causes is regarded as classification performance.

The method of calculating the reliability value given to each sensor by use of classification performance is as follows: from the sensors selected for having a predetermined ratio of effectiveness values, one sensor is excluded. That is, where as many as n sensors were selected for having a predetermined ratio of effectiveness values, n−1 sensors are selected. The classification performance is again calculated with n−1 sensors. The expression 7 (see FIG. 17) gives the reliability value where $S_n$ denotes the classification performance calculated by use of n sensors, and $S_{n-1}$ represents the classification performance calculated with n−1 sensors.

The reliability value thus given by the expression 7 includes not only the number of the data used for calculating the effectiveness value but also information about whether or not classification performance is actually improved. The sensors that have not been selected for having the predetermined ratio of effectiveness values may be considered to have a reliability value of 0.

The above-descried value is regarded as the reliability value used as an auxiliary index for selecting sensors by use of effectiveness values. For example, if a given sensor has a high effectiveness value but is given a low reliability value, that sensor may not be selected. Moreover, if a given sensor has an effectiveness value lower than a predetermined value but is given a high reliability value, the sensor may be selected. Whereas the reliability value is selected for each combination of two failure causes, that value is presented on a display to the operator as the value applicable to each of the sensors. For this reason, the reliability values of the sensors whose effectiveness values are higher than a predetermined value are totaled, and the sum is used as the reliability value of each of the sensors applicable to the failure type which is the engine stop. The calculation of the reliability value through approximation by mixture of normal distributions is performed with the same technique as that of the MPPCA.

In step 907, the features of sensor values are calculated with the similar features extracted in step 904. The features of the sensors may include a range of sensor data, an average of sensor data, and statistical values such as variance (they may be expressed as the statistical values of sensor data). These values are calculated with sample data points used for calculating the effectiveness value. For example, if a given sensor has a high effectiveness value and a data range deviating from normal, the operator may regard that sensor as one specific to the failure cause. The sensor may then be selected as a sensor effective for failure cause classification. The calculation of the features of sensor values through approximation by mixture of normal distributions is performed with the same technique as that of the MPPCA.

In step 908, classification performance of the sensor is calculated with the effectiveness value calculated in step 905.

Classification performance constitutes a value indicative of the percentage of the samples among those having undergone failure cause classification. In the present embodiment, the influence value calculation part 204 selects one sensor after another in descending order of effectiveness value until the sum of the effectiveness values of the selected sensors reaches a predetermined percentage of the sum of the effectiveness values of all sensors. The sensors thus obtained are used, in the same manner as by the classification part 209, to extract multiple samples regarding each failure cause from the failure database, classify the extracted samples into failure causes, and calculate classification performance for display.

Classification performance may be calculated as a value either for the entire failure type or for each failure cause. The user is presented with a display of how classification performance varies depending the selected sensor. This allows the user to select the sensors in such a manner that the classification performance displayed for the entire failure type or for individual failure causes is maximized. The calculation of classification performance through approximation by mixture of normal distributions is performed with the same technique as that of the MPPCA.

In step 908, the influence value calculation part 204 writes the calculated influence value to the influence value storage part 205. Here, the influence value represents the above-described effectiveness value, reliability value, sensor value features, and classification performance.

In step 910, the influence value calculation part 204 determines whether the influence values have been calculated for all combinations of failure causes under the failure type selected in step 902. If it is determined that the influence values have been calculated for all combinations of failure causes, step 911 is reached. If it is determined that the influence values have yet to be calculated for all combinations of failure causes, step 903 is reached.

In step 911, the influence value calculation part 204 integrates the influence values calculated with regard to all combinations of failure causes under the failure type selected in step 902 and then writes the integrated value en the influence value storage part 205.

The integration of effectiveness values in the present embodiment is performed as explained below. In the case of an engine stop, effectiveness values are calculated with regard to three combinations: the combination of features at the time of occurrence of crack and features at the time of occurrence of choke; that of features at the time of occurrence of crack and features at the time of occurrence of sensor failure; and that of features at the time of occurrence of chock and features at the time of occurrence of sensor failure. The sum of the effectiveness values obtained from these three combinations constitutes the effectiveness value of each of the sensors applicable to the failure type which is the engine stop.

Alternatively, the product of the effectiveness value and reliability value regarding each of the combinations may be calculated, and the results of the calculation may be integrated into a unified effectiveness value.

The effectiveness value following integration includes the sum of the reliability values for all combinations of failure causes, the features of the sensor values in the data on all combinations of failure causes used for calculating effectiveness values, or the classification performance calculated anew by the same operation as in step 908 using the integrated effectiveness value.

In step 912, the influence value calculation part 204 determines whether the influence values have been recalculated with regard to all failure types to which the samples were added. If it is determined that the influence values have been recalculated regarding all failure types, step 913 is reached. If it is determined that the influence values have yet to be recalculated with regard to all failure types, step 902 is reached.

In step 913, the flow of influence value calculations is terminated.

In the present embodiment, the influence value calculation part 204 refers to the learning results stored in the learning result storage part 203. However, since the operation performed by the influence value calculation part 204 is the comparison of learning results, there may be provided multiple learning parts each arranged to learn data on a different failure cause, and the results of such learning may be compared by the influence value calculation part 204. As another alternative, data may be learned beforehand regarding different failure causes so that the learned data may be arranged into a database for use in calculating influence values.

The influence value storage part 205 stores vehicle types, failure types, combinations of failure causes, and influence values. These items of information are written successively by the influence value calculation part 204 in accordance in the process flowchart of FIG. 9.

Figure 10:
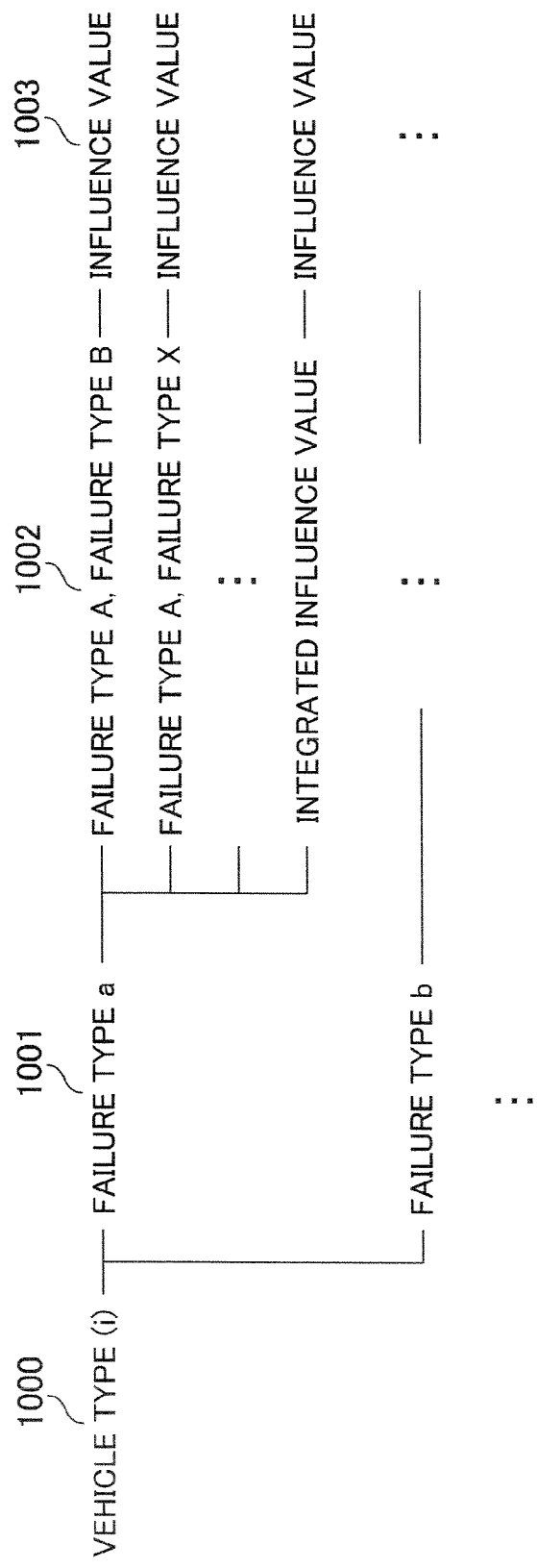
FIG. 10 is a diagram showing a structure of an influence value storage part.

FIG. 10 shows a structure of the influence value storage part 205. The influence value storage part 205 includes a vehicle type layer 1000, a failure type layer 1001, a failure cause combination layer 1002, and an influence value layer 1003. Under the vehicle type layer 1000 is the failure type layer 1001 that holds information about failure types of each known vehicle type. Under the failure type layer 1001 is the failure cause combination layer 1002. Stored in the layer 1002 are the failure cause combinations of which the influence values were calculated by the influence value calculation part 204. There also exists a layer that stores the influence values calculated by the influence value calculation part 204 after integration. Under the failure cause combination layer 1002 is the influence value layer 1003. This layer stores the influence values each corresponding to each of the failure cause combinations held in the failure cause combination layer 1002.

Figure 11:
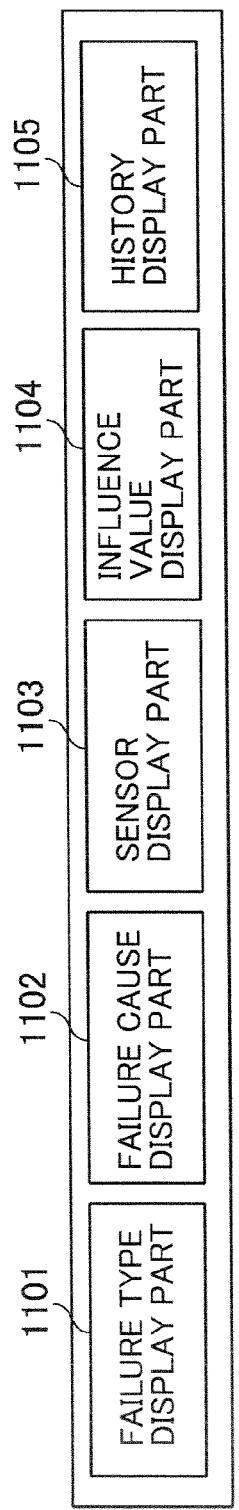
FIG. 11 diagram showing a structure of a sensor selection part.

The sensor selection part 206 allows the operator 104 to select sensors. By displaying failure types, failure causes, sensors, influence values, and diverse history information, the sensor selection part 206 assists the operator 104 in selecting sensors. FIG. 11 gives a structure of the sensor selection part 206.

FIG. 11 shows how the sensor selection part 206 is structured. A failure type display part 1101 displays failure types. A failure cause display part 1102 displays failure causes. The present embodiment has the function of displaying the influence value related to the failure cause when the latter is selected on a failure cause display. A sensor display part 1103 displays images and icons indicative of sensors.

In the present embodiment, the sensor display part 1103 has sensor-selecting buttons provided near the displayed sensors so that a desired sensor may be selected by the operator operating the corresponding button. The present embodiment further permits selection of the method by which the sensors are displayed in accordance with their influence values.

An influence value display part 1104 displays influence values. The influence values displayed on the influence value display part 1104 are related to the sensor information displayed on the sensor display part 1103. The influence value display part 1104 selects automatically the method by which the sensors are displayed in synchronism with the method of display that may be changed on the sensor display part 1103.

Further in the present embodiment, the influence value display part 1104 displays effectiveness values, reliability values, sensor value features, and classification performance. The operator 104 selects sensors in reference to the displayed effectiveness values, reliability values, and sensor value features. If the operator 104 determines that desired classification performance is achieved on the basis of the displayed classification performance value, the operator terminates the selection of sensors.

The classification performance may alternatively be displayed not in relation to sensors but in association with the failure causes displayed on the failure cause display part 1102.

The history display part 1105 displays the influence values related to past dates and times as well as situations of past sensor selection.

The operator 104 selects sensors in reference to the displayed influence values. For example, the operator 104 may select sensors in descending order of effectiveness value. In this case, those sensors having low reliability values are not selected. What is selected is a sensor that may have a low effectiveness value but is given significantly different sensor value features depending on the failure cause. The operator 104 is to select the sensor expected to make significant progress in classification performance. In particular, the operator 104 should select the sensor that may have low classification performance but is expected to improve the performance of classifying failure causes.

According to the present embodiment, the system can assist the operator 104 with no specialized knowledge in selecting sensors. If the operator 104 has specialized knowledge, the selection of sensors can be made more smoothly. More specifically, even if the operator has no mechanical knowledge, it is still possible to select the sensors effective for multivariate analysis in accordance with the displayed influence values in the present embodiment.

Moreover, the sensor selection part 206 may assist the operator 104 in sensor selection by changing the method by which influence values are displayed. Described below is how the user is supported in sensor selection with the method of display given by the sensor selection part.

First, sensors can be selected from one of multiple display methods. One method of display involves been sorted by effectiveness value. This method allows the sensors to be selected in descending order of effectiveness value.

The second method of display involves switching display and non-display depending on the effectiveness value. This method may permit display of only 10 sensors having the highest ten effectiveness values, for example The third method of display involves changing the background color of the sensor display part. For example, this method may permit display in red of the sensors with their effectiveness values in the highest 30 percent of all effectiveness values, and display in yellow of the sensors with their effectiveness values in the next-highest 50 percent of all effectiveness values.

It is also possible to display the sensors in relation to their effectiveness values, reliability values, and sensor value features. For this reason, these three may be sorted separately and subjected to the switching between display and non-display in synchronism with the sensor display method in use.

The sensor selection part 206 is also characterized by the function of displaying the influence values of each failure cause. When a given failure cause is selected from the display of the sensor selection part, the present embodiment allows the sensor selection part to display the influence values related to the selected failure cause. While selecting sensors in reference to all effectiveness values, the user may find a failure cause with which classification performance is difficult to improve. In that case, the sensor selection part displays only the influence values related to the failure cause. Referring to the influence values thus displayed allows the user with no knowledge of multiple failure causes to select the sensor such that classification performance will improve even when given a specific failure cause alone. The influence values displayed here constitute an index for classifying two failure causes, so that the influence value of the selected failure cause and that of the different failure cause are displayed individually. Alternatively, the sum of the influence values related to the selected failure cause may be displayed. If the crack, for example, is selected as the failure cause, the former method allows the influence value for classifying crack and choke and that for classifying crack and sensor failure to be displayed individually in relation to sensors. The latter method allows the sum of the influence value for classifying crack and choke and of that for classifying crack and sensor failure to be displayed in relation to sensors. Any one of these methods of display may be selected as desired.

The sensor selection part 206 is also characterized by the function of displaying how effective each sensor is for classification of specific failure causes. When one of the sensors displayed on the sensor selection part 206 is selected, the present embodiment causes the sensor selection part to display a breakdown of failure causes applicable to the influence value of the selected sensor. This allows the user to verify a specific failure cause of which the classification is made effective by the sensor that is about to be selected. Thus if the sensor to be selected is found to have sufficient classification performance for effectively selecting failure causes, that sensor may not be selected.

Moreover, the sensor selection part 206 is characterized by the function of displaying a history of past influence values. In the present embodiment dates and times and the influence values related thereto are displayed. Suppose that there is a sensor of which the influence value varied significantly at a given date and time. In that case, the user may consider the sensor to be one which intrinsically has a high influence value but which manifested a low influence value at the time of data expansion before selecting that sensor. The user may also consider the sensor to be one which intrinsically has a low influence value but which manifested a high influence value at the time of data expansion before excluding that sensor from the selection.

The sensor selection part 206 is also characterized by the function of displaying previously selected sensors together with the dates and times at which they were selected as well as displaying the influence values of the selected sensors. The display allows the user to select sensors at present in reference to the previously selected sensors and their influence values at that point. If the classification performance has been changed significantly because the selected sensors were previously changed, the user may select deselect the changed sensors.

Figure 15:
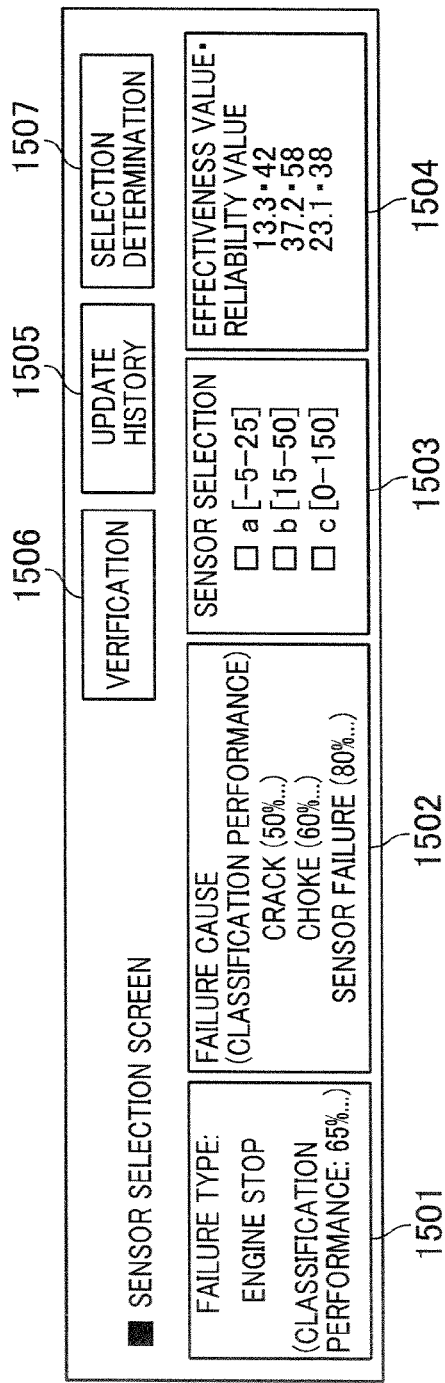
FIG. 15 is a diagram showing a typical screen of the sensor selection part.

FIG. 15 shows a specific example of the screen of the sensor selection part. A failure type display part 1501 displays the failure type under which sensors are selected. The failure type display part 1501 also displays the classification performance regarding all samples related to the failure type. This display corresponds to that of the failure type display part 1101.

A failure cause display part 1502 displays the failure causes corresponding to the failure type displayed on the failure type display part 1501. The failure cause display part 1502 also displays the classification performance regarding the samples related to each failure cause. This display corresponds to that of the failure cause display part 1102.

A sensor display part 1503 displays images indicative of sensors (e.g., signs, icons, or their combinations). The operator 104 selects sensors from this display. The sensor display part 1503 also displays the feature of each sensor value. Displayed here are a minimum and a maximum value of each sensor as the sensor value features. This display corresponds to that of the sensor display part 1103.

An influence value display part 1504 displays influence values. Displayed here are effectiveness values and reliability values. On this screen example, the classification performance and sensor value features are displayed in conjunction with the displayed failure type, failure causes, and sensors. This display corresponds to that of the influence value display part 1104.

A history display part 1505 displays the history of sensors and influence values. The display by this part is carried out at the time the operator selects the history display part 1505. This display corresponds to that of the history display part 1105.

A verification part 1506 is executed when selected by the operator 104. The verification part 1506 recalculates the classification performance based on the sensor selected at that point.

A selection determination part 1507 is selected when the operator 104 determines that a desired classification performance has been fulfilled. The selection determination part 1507 generates a classifier based on the sensor selected at this point.

Figure 16:
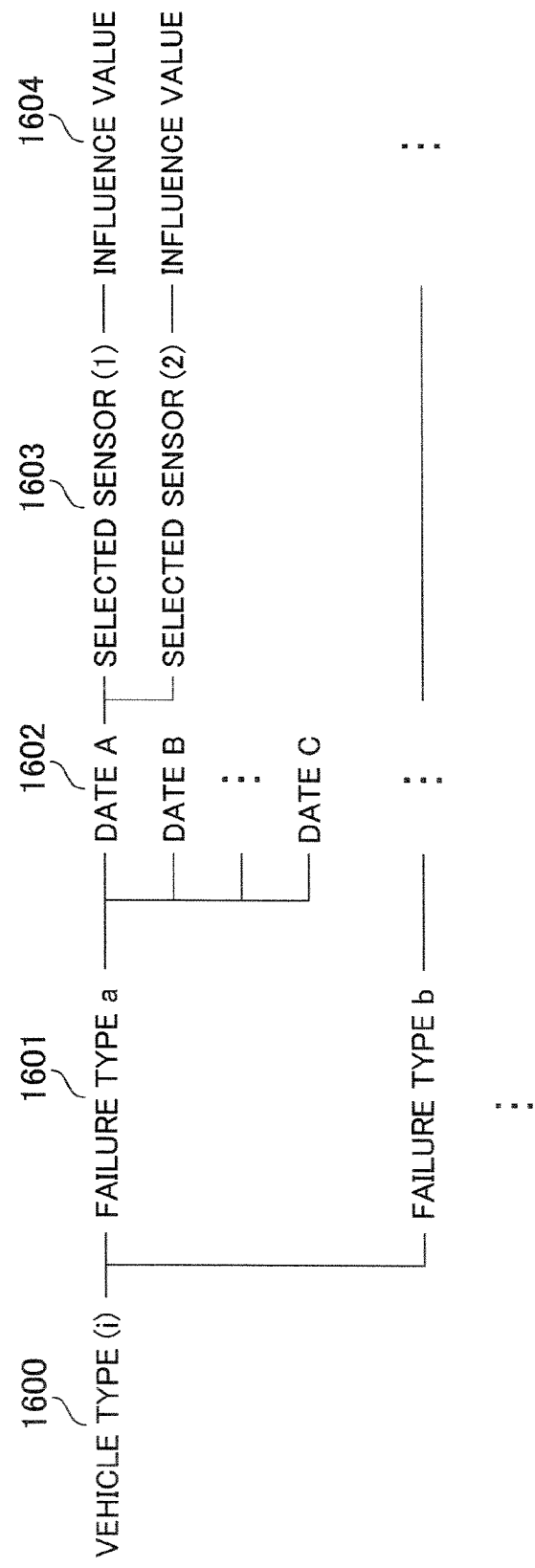
FIG. 16 is a diagram showing a structure of a history storage part.

FIG. 16 shows a hierarchy of a history storage part. In the history storage part, a vehicle type layer 1600 stores vehicle types. A failure type layer 1601 stores failure types. A date layer 1602 stores the dates on which failure types were updated individually. A selected sensor layer 1603 stores the selected sensors. An influence value layer 1604 stores the influence values corresponding to the selected sensors.

The history storage part stores, by failure type, the information about dates, the information about selected sensors, and the influence values related to the selected sensors. These items of information are written to the history storage part by the sensor selection part. The write operation is performed every time the operator recalculates classification performance.

Moreover, the history of the sensors and of their influence values displayed at a time of selection of the history display part 1505 is displayed in a manner similar to the hierarchy of the history storage part in FIG. 16.

The classifier storage part 207, storing a failure cause classifier with regard to each failure type, retains information about vehicle types, failure types, and failure cause discriminators. The failure cause discriminator determines whether test data matches the features of a learned failure on the basis of the results of learning about each failure cause.

Figure 12:
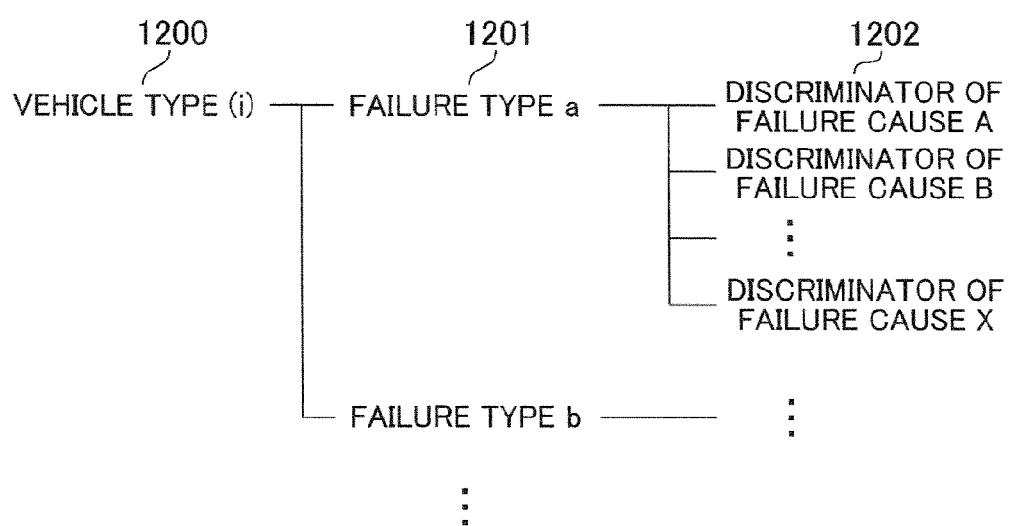
FIG. 12 is a diagram showing a structure of a classifier storage part.

These items of information are written to the classifier storage part by the sensor selector part 206 when the operator has finished selecting the sensors. FIG. 12 shows a structure of the classifier storage part.

The classifier storage part includes vehicle types 1200, failure types 1201, and failure cause discriminators 1202.

In the present embodiment, only the items related to the selected sensors are extracted from the results of learning about each failure cause previously stored in the learning result storage part 203. That is, the values irrelevant to the selected sensors are deleted from the averages, weighted matrices, or variances stored in the learning result storage part 203. Alternatively, the learning part 202 may be allowed to relearn using the information about the selected sensors and the information from the failure database, thereby generating the failure cause classifier.

The sensor data 208 constitute samples with which failure cause classification is performed. The sensor data may be the samples in the failure database or the actual data acquired from the vehicle 101. The former sensor data may be used for the evaluation of classification performance based on the selected sensors; the latter sensor data may be utilized for efficient maintenance in accordance with the information about the obtained failure cause.

Figure 13:
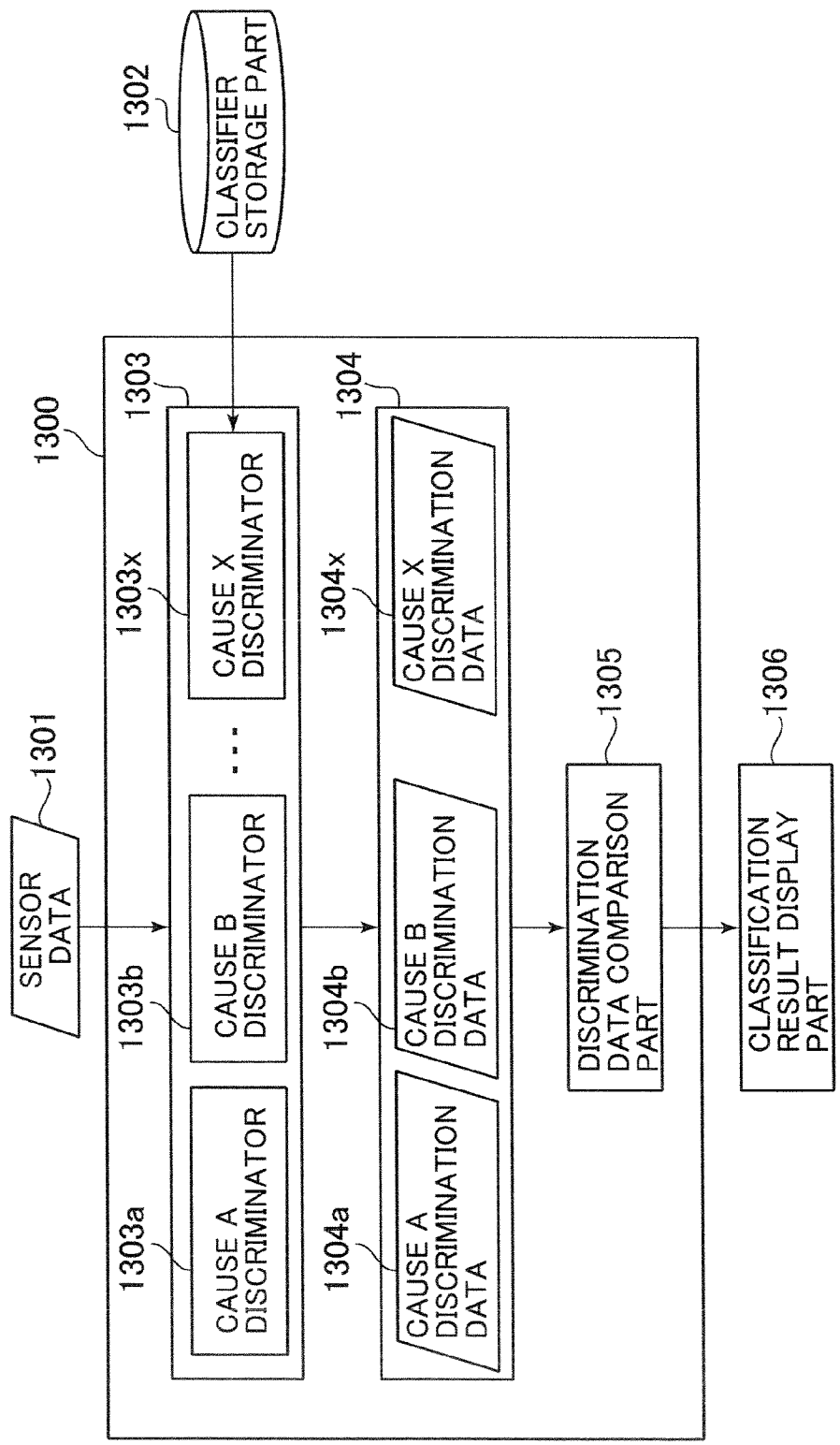
FIG. 13 is a diagram showing a structure of a classification part.

The classification part 209 classifies the failure causes in the sensor data 208 using the information from the classifier storage part 207, and outputs the results of classification to the classification result display part 210. The classification part 209 is executed every time sensor data 208 is given. FIG. 13 gives a rough diagram of the processing performed by the classification part 209.

FIG. 13 roughly depicts the processing carried out by the classification part. The processing in FIG. 13 includes a classification part 1300, sensor data 1301, a classifier storage part 1302, a failure cause discriminator 1303, failure cause discrimination data 1304, a discrimination data comparison part 1305, and a classification result display part 1306.

The sensor data 1301 is the same as the sensor data 208 in FIG. 2. The classification result display part 1306 is the same as the classification result display part 210 in FIG. 2.

Once the sensor data 1301 is input, the classification part 1300 invokes the failure cause discriminator 1303 of the applicable failure type from the classifier storage part 1302.

The failure cause discriminator 1303 includes cause discriminators 1303*a* through 1303*x* corresponding to individual failure causes. A cause A discriminator 1303*a* calculates the proximity between the sensor data 1301 and a failure cause A. What is shown here in the present embodiment is the operation of the cause A discriminator 1303*a* according to the MPPCA. The cause A discriminator 1303*a* holds such features as the cluster number, average, weighted matrix, mixture ratio, and variance serving as the results of learning about the failure cause A. The cause A discriminator 1303 calculates the likelihood of the sensor data 1301 regarding the failure cause A in terms of features. Here, the features are compared by use of the sensors selected by the sensor selection part 306. The likelihood thus calculated constitutes an index representing the proximity between the sensor data 1301 and the failure cause A in terms of features. The likelihood is stored as cause A discrimination data 1304*a*.

The likelihood of the sensor data 1301 is calculated regarding each of all cause discriminators 1303*a* through 1303*x* under the corresponding failure type. The results of the calculations are stored into the cause A discrimination data 1304*a* through the cause X discrimination data 1304*x* in the cause discrimination data storage part 1304.

The discrimination data comparison part 1305 classifies failure causes by comparing the individual cause discrimination data 1304*a* through 1304*x* stored in the cause discrimination data storage part 1304.

In the present embodiment, the likelihood ratios of the individual failure causes are calculated. The likelihood ratios thus calculated are regarded as the probability corresponding to each of the failure causes and are converted to percentages that will be output to the classification result display part 1306.

The classification result display part 210 displays the result of failure cause classification obtained by the classification part 209. This information is written to the classification result display part 210 by classification part 209. The classification result display part 210 is executed every time the result of classification is output from the classification part 209. If the sensor data 208 has been obtained from the vehicle 101, the same information as that of the classification result display part 210 is displayed at the maintenance base 105 for use in efficient maintenance work.

Figure 14:
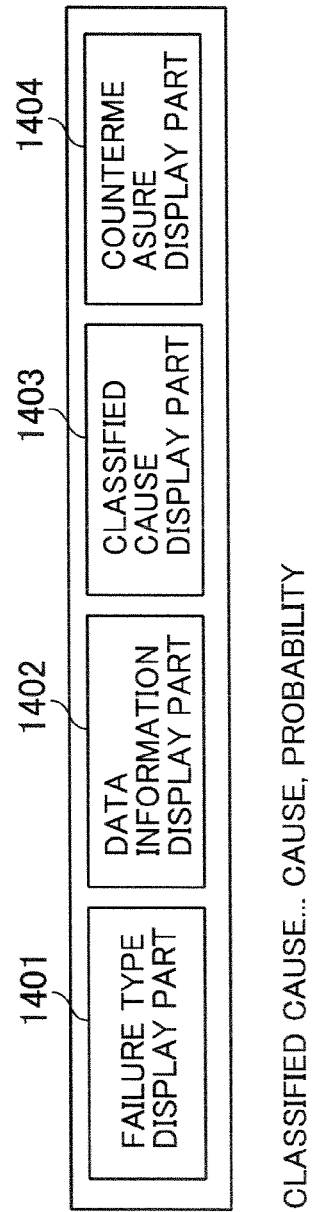
FIG. 14 is a diagram showing a structure of a classification result display part.

FIG. 14 gives a rough diagram of the classification result display part 210. FIG. 14 shows how the classification result display part 210 is structured. The classification result display part 210 includes a failure type display part 1401, a data information display part 1402, a classified cause display part 1403, and a countermeasure display part 1904. The failure type display part 1401 displays a failure type. The data information display part 1402 displays information about the sensor data 208. The information includes the features of the values of individual sensors and time-series data on the sensors. The classified cause display part 1404 displays countermeasures a the previously registered failure causes. At the maintenance base 105, maintenance work is performed efficiently in reference to the probability of the displayed failure cause and the countermeasure against the failure cause.

The present invention is not limited to the embodiments discussed above and may also be implemented in diverse variations. For example, part of each of the embodiments may be singled out, deleted, or replaced by another part of the embodiments. These variations still stay within the scope of this invention disclosed herein.

According to the present invention, the status other than that which is related to abnormality data serving as the basis may be said to be normal.

Further according to the present invention, the vehicle is not limited to commercial cars. The idea of the present invention may also be applied to the maintenance of moving bodies other than vehicles such as ships and aircraft as well as machines other than moving bodies.

What is claimed is:

1. A failure cause classification apparatus comprising:
   a processing part; and
   a failure database, wherein:
   the failure database stores machine failure causes of vehicles in relation with sensor data of the vehicles,
   the sensor data include at least one of an accelerator position, an engine speed and a temperature, and
   the processing part is configured to:
   learn failure features from the sensor data stored in the failure database;
   based on a result of learning, obtain similar failure features from among the failure features of at least two machine failure causes;
   compare the similar failure features obtained; and
   obtain an influence value serving as an index for selecting a sensor effective for classifying the machine failure causes based on a result of comparing, wherein:

the influence value includes an effectiveness value indicating whether a candidate sensor is effective for classifying the machine failure causes; and a selection screen for selecting sensors, wherein the selection screen displays a sensor selection part that displays the influence value and sensor identifications and allows the candidate sensor to be selected.

2. The failure cause classification apparatus according to claim 1, wherein the influence value further includes a reliability value indicating whether the influence value is reliable.

3. The failure cause classification apparatus according to claim 2, wherein the reliability value is a function of the number of sensor data used for evaluating the effectiveness value.

4. The failure cause classification apparatus according to claim 3, wherein the influence value includes classification performance indicating percentage of the machine failure causes classified correctly by the selected sensor among all classified machine failure causes.

5. The failure cause classification apparatus according to claim 1, wherein the selection screen displays the classification performance and updates the displayed classification performance in accordance with the sensor selected by the sensor selection part.

6. The failure cause classification apparatus according to claim 5, wherein the selection screen displays images indicative of the candidate sensors; and wherein the selection screen changes a method by which the images are displayed in accordance with the influence value.

7. The failure cause classification apparatus according to claim 6, wherein the selection screen displays machine failure causes and, when a specific machine failure cause is selected from the displayed machine failure cases, changes the display of the influence value in accordance with the selected machine failure cause.

8. The failure cause classification apparatus according to claim 6, wherein the selection screen has a function of changing the display of the influence value in accordance with a specific image when the specific image is selected from among the images.

9. The failure cause classification apparatus according to claim 8, wherein the selection screen displays a history of the influence value in the past.

10. The failure cause classification apparatus according to claim 9, wherein the selection screen displays a history of the images previously selected.

\* \* \* \* \*